US010837866B2

(12) United States Patent
Acur

(10) Patent No.: US 10,837,866 B2
(45) Date of Patent: Nov. 17, 2020

(54) SELF-LEARNING MALFUNCTION MONITORING AND EARLY WARNING SYSTEM

(71) Applicant: Delphisonic, Inc., New York, NY (US)

(72) Inventor: Muhammet Ali Acur, Istanbul (TR)

(73) Assignee: DELPHISONIC, INC., New York, NY (US)

( * ) Notice: Subject to any disclaimer, the term of this patent is extended or adjusted under 35 U.S.C. 154(b) by 341 days.

(21) Appl. No.: 16/010,165

(22) Filed: Jun. 15, 2018

(65) Prior Publication Data

US 2019/0323922 A1 Oct. 24, 2019

(30) Foreign Application Priority Data

Apr. 19, 2018 (TR) .............................. a 2018 05591

(51) Int. Cl.
| | | |
|---|---|---|
| *G01M 15/02* | (2006.01) | |
| *G01P 3/44* | (2006.01) | |
| *G01H 1/00* | (2006.01) | |
| *G01K 13/00* | (2006.01) | |

(52) U.S. Cl.
CPC ............ *G01M 15/02* (2013.01); *G01H 1/006* (2013.01); *G01K 13/00* (2013.01); *G01K 2205/00* (2013.01); *G01P 3/44* (2013.01)

(58) Field of Classification Search
CPC ....... G01M 15/02; G01M 13/045; G01P 3/44; G01K 2205/00; G01K 13/00; G01H 1/006
See application file for complete search history.

(56) References Cited

U.S. PATENT DOCUMENTS

| | | | | |
|---|---|---|---|---|
| 5,566,092 A | * | 10/1996 | Wang | G05B 19/4184 |
| | | | | 700/159 |
| 7,403,850 B1 | * | 7/2008 | Boutin | G01M 15/05 |
| | | | | 701/107 |
| 9,845,012 B2 | * | 12/2017 | Lu | B60L 3/0061 |
| 2005/0096873 A1 | | 5/2005 | Klein | |
| 2006/0064291 A1 | | 3/2006 | Pattipatti et al. | |
| 2019/0184824 A1 | * | 6/2019 | Guan | G07C 5/0841 |
| 2019/0188924 A1 | * | 6/2019 | Guan | G07C 5/0816 |

FOREIGN PATENT DOCUMENTS

| | | |
|---|---|---|
| CN | 2124173 U | 12/1992 |
| CN | 102706572 A | 10/2012 |
| CN | 202885861 U | 4/2013 |
| DE | 19919604 A1 | 11/2000 |

OTHER PUBLICATIONS

Notification, International Search Report, and Written Opinion of the International Searching Authority dated Jan. 8, 2020 issued in the International application No. PCT/TR2019/050173 filing date of Mar. 18, 2019, 9 pages.

* cited by examiner

*Primary Examiner* — Mohammad K Islam
(74) *Attorney, Agent, or Firm* — Kilpatrick Townsend & Stockton LLP

(57) ABSTRACT

Embodiments provide a malfunction monitoring and early warning system which can learn the determined malfunction data. The malfunction monitoring and early warning system may be used in connection with engines of different fields such as industrial engines, wind turbine engines, rail transport engines. The malfunction monitoring and early warning system ensures early detection of malfunction, required maintenance, and early warning determination by monitoring the temperature, vibration, and speed information of the engine monitored by the system.

15 Claims, 2 Drawing Sheets

SELF-LEARNING MALFUNCTION MONITORING AND EARLY WARNING SYSTEM

CROSS-REFERENCES TO RELATED APPLICATIONS

The present application claims priority to Turkish Patent Application No. 2018/05591 entitled ÖĞRENEBİLEN ARIZA TAKİP VE ERKEN UYARI SİSTEMİ, filed Apr. 19, 2018, which disclosure is incorporated herein in its entirety.

BACKGROUND OF THE INVENTION

The present invention relates to a malfunction monitoring and early warning system which can learn the determined malfunction data, is used in engines of different fields such as industrial engines, wind turbine engines, rail transport engines, and ensures malfunction, maintenance, and early warning determination by monitoring the temperature, vibration, and speed information of the engine on which it is used.

Engines are used in almost all fields in the industry for performing various works. In industrial applications, operation of all types of machines is usually ensured by engines. Engines generate power and said power is used for operation of machines. Different types of engines are used according to the characteristics and application areas of machines, and operation of the machines is ensured by means of said engines.

Some of the areas where engines are commonly used are as follows: wind turbines, railway rail system transportation, manufacturing, ship transportation, petroleum platforms, aircrafts and aviation industry and so on.

In areas where an engine is used, it is quite important that the engine used is suitable for the work to be done, the engine is used efficiently, the engine maintenance is done on time, and malfunctions occurring in the engines are detected and timely intervened. As all machines, engines also have service lives. The service life of an engine can vary depending on its usage conditions, operating temperature, the level of vibration the engine gets exposed to, the operating speed of the engine, and compliance with periodic maintenance. Timely maintenance is required for engines to ensure their efficient and problem-free use. Usage conditions of engines should be monitored so as to plan their maintenance periods according to the usage conditions, and their maintenance should be performed on time.

Today, there are systems used for monitoring the conditions of use of engines and detecting their malfunction situations. In said systems, vibration, temperature, and speed parameters of engines are recorded by non-smart devices that cannot perform interpretation, and are reported by human-dependent systems. A significant technical problem encountered in recording and monitoring systems used in the state of the art applications is that engine data is only recorded and reported by human-dependent systems. Not being able to monitor engine operation data while recording the data with a dynamically learning structure, and not being able to dynamically estimate the malfunction and maintenance times according to engine operating conditions are significant technical problems. In systems known in the state of the art, there is no procedure for predicting engine malfunction or maintenance times, estimating maintenance times by means of monitoring the use of the engine. Lots of mistakes are made with the state of the art malfunction determinations and manual maintenance times.

BRIEF SUMMARY OF THE INVENTION

Various embodiments are directed to a self-learning malfunction monitoring and early warning system which predetermines engine malfunction and maintenance times by continuously measuring engine operating conditions, engine temperature, speed, and vibration.

Various embodiments are directed to a malfunction monitoring and early warning system which self-learns about encountered malfunctions according to engine operating conditions, and develops new malfunction conditions according to the learned malfunctions.

Various embodiments are directed to a malfunction monitoring and early warning system which updates maintenance scheduling according to the learned new engine malfunctions, and then performs new estimations according to the updates.

Various embodiments are directed to a malfunction monitoring and early warning system which performs malfunction maintenance estimation beforehand, and provides a common malfunction maintenance program for engines that are found close to each other.

Embodiments provide a malfunction monitoring and early warning system coupled to an engine. The malfunction monitoring and early warning system comprises a speed sensor coupled to the engine to detect a speed of the engine via an engine rotor; a temperature sensor coupled to the engine to measure an operating temperature of the engine; a vibration sensor coupled to the engine or a place where the engine is fixed, to measure a level of vibration generated during operation of the engine or the engine is subjected to; a malfunction monitoring module including a processor, a memory, a communication unit, and an experience database. The malfunction monitoring module is configured to receive measurement values by communicating with the speed sensor, the temperature sensor, and the vibration sensor. The measurement values include the detected speed of the engine, the measured operating temperature, the measured level of vibration. The malfunction monitoring module is further configured to perform engine malfunction estimation by interpreting the measurement values according to predetermined engine usage conditions stored in the experience database using the processor, predict malfunction and engine maintenance times, and predict each malfunction together with a reason of the malfunction by means of recording encountered malfunctions and the speed, the operating temperature, and the level of vibration at which the encountered malfunctions occur.

The processor is configured to determine parts of the engine that are required to be replaced and corresponding time period for replacing the parts by comparing the measurement values with the predetermined engine usage conditions stored in the experience database. When a type of malfunction that is not recorded in the experience database is encountered, the malfunction monitoring module is configured to determine at which total temperature, speed, and vibration values the engine had been used before the type of malfunction, and the reason of the type of malfunction; and record determined values in the experience database together with engine type information thereby continuously updating the experience database with new malfunctions so as to learn about the new malfunctions. The experience database is configured to record, via the processor, the malfunction and the reason associated with the malfunction, when an engine malfunction that is not previously recorded is encountered, and to ensure that malfunction control and estimation is performed while a new malfunction analysis is being made.

The malfunction monitoring and early warning system further comprises a malfunction display module configured to communicate with the malfunction monitoring module via a wired, wireless, Ethernet, or can bus connection, and display visual graphics of the engine to output the engine malfunction, the reason of the engine malfunction, one or more suggestions, and the engine maintenance times based on data received from the malfunction monitoring module.

With the malfunction monitoring and early warning system according to the present application, usage conditions and malfunctions of engines are monitored, prediction is made about malfunction and maintenance times according to these usage conditions, and notification is provided to users or operators about the predictions.

DETAILED DESCRIPTION OF THE INVENTION

Figure 1:
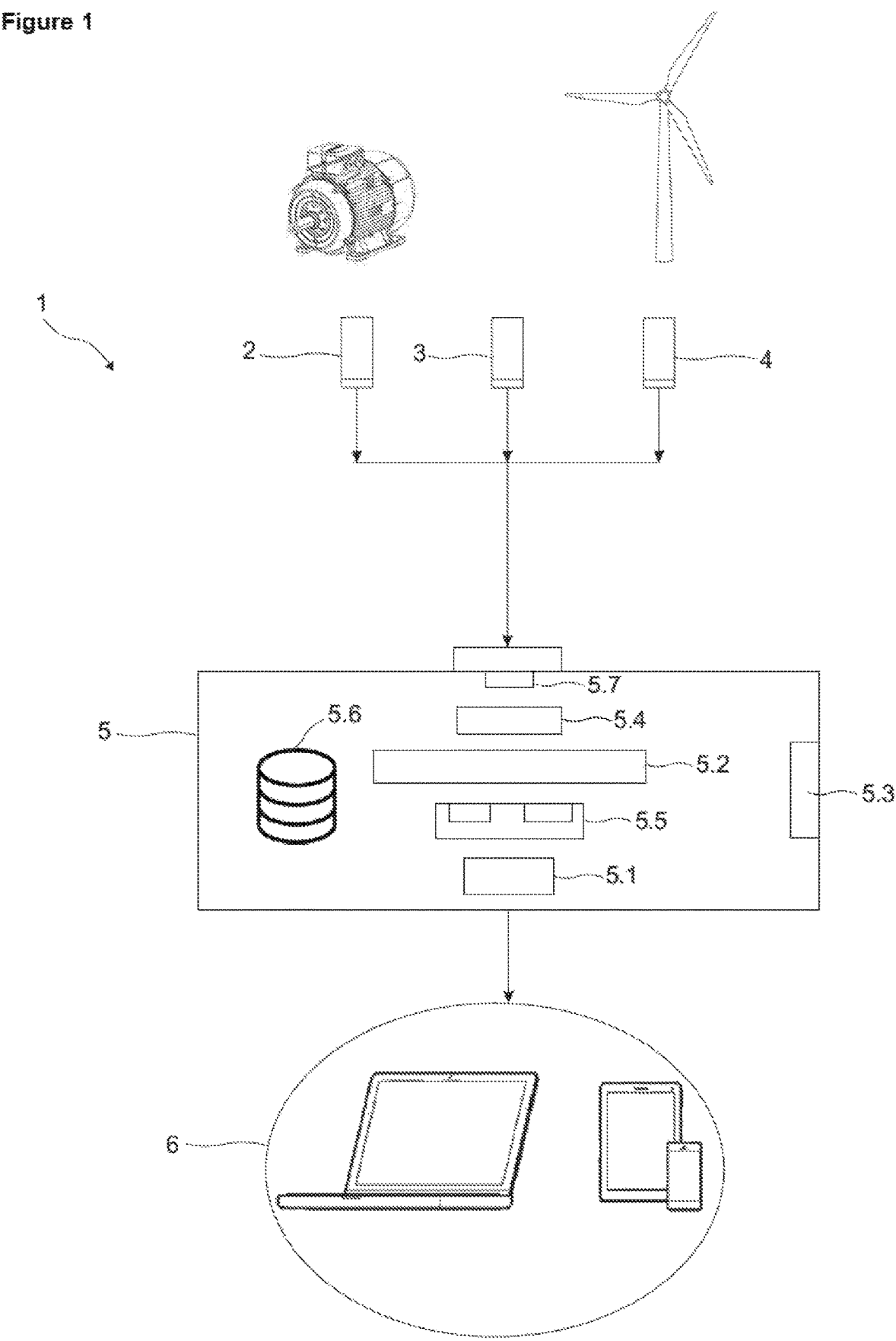
FIG. 1 is a schematic view of the malfunction monitoring and early warning system.

Embodiments are directed to measuring temperature, speed, and vibration data of the engine, recording said data, and performing estimations for engine malfunction and/or maintenance times according to the obtained data. Embodiments provide a self-learning system, in which the malfunctions encountered, the reasons of the malfunctions, maintenance results according to maintenance periods are recorded and learned by the system, and used for determining the maintenance time in the next malfunction determination. Accordingly, embodiments are directed to monitoring and recording operation of the engines, and performing maintenance and malfunction estimations according to the usage conditions of the engine.

According to various embodiments, the operating conditions and times of the engine are monitored by means of sensors. A possible malfunction estimation and a maintenance time estimation are performed according to the engine operating time (e.g. duration of the operation) and operating conditions. The system described herein has a self-learning structure. The results of all malfunctions, errors, and failures that occur during use of the system is learned by the system, and determination is made for the next similar situation.

According to various embodiments, temperature, speed, and vibration data of the engine are monitored so as to determine the operating conditions of the engine and perform maintenance and malfunction time estimation (prediction) according to said data.

According to various embodiments, the operation of the engines is monitored continuously and instantaneously. The operating conditions of the engine are monitored by measuring the vibration, temperature, and speed information during operation of the engine. Since maintenance and malfunctions of an engine are dependent on the operating conditions and operating times of the engine, the maintenance periods of the engine are determined according to the actual operating conditions of that engine. A possible malfunction is preemptively estimated to inform relevant people. Embodiments further provide a self-learning structure. The system according to various embodiments may learn, improve itself as the system works, and automatically digitalize all kinds of malfunctions. In this way, maintenance times are predicted, maintenance is determined in a planned way, and significant cost advantages are achieved in terms of maintenance costs.

Embodiments provide a malfunction monitoring and early warning system that includes sensors placed on an engine for measuring the speed/revolution, vibration, and temperature values of the engine, a malfunction monitoring module to which the sensors are connected, and a malfunction monitoring module showing the engine operation, malfunction and maintenance situations according to the information received from the malfunction monitoring module. The malfunction monitoring module records the measurement values received from the sensors and determines whether the measured values meet the conditions of use and whether they indicate a malfunction or not by comparing the same with the values in the database. The malfunction monitoring module not only detects malfunctions but also monitors the engine usage conditions and estimates the maintenance periods according to the usage conditions, and transmits said data to the malfunction display module. The malfunction display module is a web based application or an application that can be used in smart devices. It visually displays the information received from the malfunction monitoring module and the usage values of the engine, and allows the user to monitor the operation of the engine. The patent according to the present application has a self-learning, self-improving system structure. The malfunction monitoring module comprises the experience database, and the experienced malfunctions are recorded into said database together with the information including the reason of malfunction, usage conditions before the malfunction, type of the engine, and characteristics of the engine etc. In this way, the system continuously improves itself and learns about new malfunctions and their reasons, and gives malfunction and maintenance warnings by comparing with new malfunctions while performing malfunction monitoring.

An exemplary malfunction monitoring and early warning system is shown in FIG. 1. The components given in the figures are enumerated individually, and the meanings of these numbers are given below.

1. Malfunction monitoring and early warning system
2. Speed sensor
3. Temperature sensor
4. Vibration sensor
5. Malfunction monitoring module
5.1. Processor
5.2. Memory
5.3. Communication unit
5.4. Signal converter
5.5. Filter
5.6. Experience database
5.7. Amplifier
6. Malfunction display module The malfunction monitoring and early warning system (1) according to the invention is a system which performs malfunction monitoring and gives warning in dangerous situations for systems that may be associated with, for example, rail systems, manufacturing, ship transportation, wind turbine, oil platforms, and aviation sector. The malfunction monitoring and early warning system (1) ensures estimation (prediction) of malfunction situations and maintenance times of engines having different characteristics and being used in different areas in industry, according to their usage conditions. The malfunction monitoring and early warning system (1) according to the invention has a self-learning structure, and records engine malfunctions together with the engine usage conditions during and before occurrence of the malfunction, and thus expands stored, readily available malfunction information and uses the new information in malfunction analysis and comparison. An electronically embedded smart card and a cloud based software signal mechanism algorithms are used in the malfunction monitoring and early warning system (1). The malfunction monitoring and early warning system (1) is placed in rotating and moving accessories of all of the above said machines in industry, and early malfunction estimation is made by examining mechanical vibration wave forms during operation of the engine by means of a high frequency accelerometer vibration sensor (4). In this way, operational maintenance activities and maintenance costs are reduced in machines where the malfunction monitoring and early warning system (1) is used.

The malfunction monitoring and early warning system (1) which is used in industrial engines, and ensures malfunction, maintenance, and early warning determination by monitoring the temperature, vibration, and speed information of the engine on which it is used, and can learn the determined malfunction data, comprises the following components:

at least one speed sensor (2) placed in the engine to detect the engine revolutions or speed via the engine rotor, at least one temperature sensor (3) placed on or in the engine to measure the operating temperature of the engine, at least one vibration sensor (4) placed at the engine or at the place where the engine is fixed, to measure the level of vibration generated during operation of the engine or the engine is subjected to, at least one malfunction monitoring module (5) comprising at least one processor (5.1), at least one memory (5.2), at least one communication unit (5.3), and at least one experience database (5.6), receiving measurement values by communicating with a speed sensor (2), a temperature sensor (3), and a vibration sensor (4), and adapted to perform engine malfunction estimation by interpreting said measurement values according to ideal engine usage conditions using the processor (5.1) and the experience database (5.6) found therein, predetermine the malfunction and engine maintenance times, and ensure determination of each malfunction together with its reasons by means of recording encountered malfunctions and the speed, temperature, and vibration values at which the malfunction occurs, at least one processor (5.1) which is adapted to ensure that the experience database (5.6) learns about malfunctions by being continuously updated by recording, in the experience database (5.6), malfunctions that are not previously recorded in the experience database (5.6), together with the information of the engine type and measurements of engine usage such as temperature, speed, and vibration, before the malfunction is encountered, an experience database (5.6) which is adapted to record, via the processor (5.1), the malfunction and its reasons, when an engine malfunction that is not previously recorded is encountered, and to ensure that malfunction control and estimation is performed using the updated malfunction list while a new malfunction analysis is being made, at least one malfunction display module (6) which communicates with the malfunction monitoring module (5) via wired, wireless, Ethernet, or can bus connection, can be operated through the internet or a smart device, comprises visual graphics of the monitored engine, and allows the user to see the engine malfunction, the reason of malfunction and suggestions, and the engine maintenance time according to the data received from the malfunction monitoring module (5).

The malfunction monitoring and early warning system (1) consists of three main structures. The first structure is the structure where the sensors used for monitoring the operation of the engine on which malfunction and maintenance monitoring will be made. The second structure is the malfunction monitoring module (5) where malfunction determination and early malfunction determination are made according to the data received from the sensors. The third structure is a malfunction display module (6) allowing the user to visually see the malfunctions according to the data received from the malfunction monitoring module (5), and preferably operating on cloud in a web-based and/or smart device-based manner.

The operation of the engine is preferably detected by the speed sensor (2), the temperature sensor (3) and the vibration sensor (4) coupled to (e.g. positioned on, in, or around) the engine. In an embodiment of the invention, an encoder or a tachometer is used as the speed sensor (2), and the speed data is detected by means of said sensors. The speed sensor (2) preferably measures the rotation of the rotor or the engine shaft so as to calculate the revolution or rotation speed of the engine. For example, in a malfunction monitoring and early warning system used in engines of vehicles such as trains, the speed of the engine is measured. In engines used for tasks such as starting, rotating, or pushing a machine on industrial sites, the revolution of the engine shaft or rotor is measured.

The speed sensor (2) has a wired or wireless connection with the malfunction monitoring module (5). The speed sensor (2) continuously measures the speed and/or revolution of the engine and immediately transmits the measurement results to the malfunction monitoring module (5). The speed sensor (2) transmits the measurement values in a digital or analogue way.

A temperature sensor (3) is used in the malfunction monitoring and early warning system (1) according to the invention to measure the temperature of the engine. The temperature sensor (3) has a wired or wireless connection with the malfunction monitoring module (5). The temperature sensor (3) is mounted on the engine or in the engine, so that it measures the temperature of the engine during operation. The temperature sensor (3) transmits the measurement values in a digital or analogue way. The malfunction monitoring module (5) controls the operating temperature of the engine according to the value received from the temperature sensor (3).

Another factor that directly affects the expected life, malfunctioning, and maintenance periods of the engine is the vibration of the engine. In the malfunction monitoring and early warning system (1) according to the invention, the vibration level of the engine is measured by means of the vibration sensor (4) positioned at the engine or at the place where the engine is inserted. In an embodiment of the invention, piezoelectric vibration sensor is used as the vibration sensor (4). The vibration sensor (4) has a wired or wireless connection with the malfunction monitoring module (5). The vibration sensor (4) can transmit the measurement values to the malfunction monitoring module (5) in a digital or analogue way. The malfunction monitoring module (5) controls the level of vibration that the engine is subjected to, according to the value it obtains from the vibration sensor (4).

In an embodiment of the invention, the speed sensor (2), the temperature sensor (3) and the vibration sensor (4) have an integrated structure. The speed, temperature, and vibration of the engine can be detected by means of a single integrated detection unit placed on the engine.

In the malfunction monitoring and early warning system (1) according to the invention, the operating conditions of the engine are measured by the speed sensor (2), temperature sensor (3), and vibration sensor (4), and then transmitted to the malfunction monitoring module (5). The malfunction monitoring module (5) is adapted to track and monitor the operating conditions of the engine according to the measurement values obtained from the sensors (3, 4, 5). In an embodiment of the invention, the malfunction monitoring module (5) comprises a processor (5.1), a memory (5.2), a communication module (5.3), a signal converter (5.4), a filter (5.5), an experience database (5.6), and preferably an amplifier (5.7).

In an embodiment of the invention, the malfunction monitoring module (5) has signal inputs for connection of the speed sensor (2), temperature sensor (3), and vibration sensor (4). In an embodiment of the invention, the temperature sensor (3) and the vibration sensor (4) transmit the measurement results to the malfunction monitoring module (5) as analogue signals, and the signal converter (5.4) found in the malfunction monitoring module (5) converts said analogue signals into digital signals. The signal converter (5.4) preferably transmits the measured values of the engine to the processor (5.1) as a digital signal.

In an embodiment of the invention, the speed sensor (2) and the temperature sensor (3) are connected to the amplifier (5.7). The amplifier (5.7) can either be positioned within the malfunction monitoring module (5) or be positioned in an independent structure outside the malfunction monitoring module (5). The speed sensor (2) and the temperature sensor (3) enter the values to the amplifier in the form of analogue signal (5.7), and the amplifier (5.7) amplifies said signals and transmits thereof to the malfunction monitoring module (5). In an embodiment of the invention, the amplifier (5.7) amplifies analogue signals directly or in an isolated manner.

In an embodiment of the invention, the signal converter (5.4) and/or sensors (2, 3, 4) are connected to the filter (5.5). The signals received from the signal converter (5.4) are filtered by the filter (5.5) to eliminate unclear signals, and the signals are enhanced by the filter (5.5).

With the filter (5.5), noise is eliminated from the signals received from the speed sensor (2), temperature sensor (3), and vibration sensors (4), and the values are read more clearly.

In an embodiment of the invention, the signals received from the speed sensor (2) and/or temperature sensor (3) and/or vibration sensors (4) that perform analogue measurement are separated by the filter (5.5). Said signals are filtered (5.5) separately to receive each sensor value after they come out from the signal converter (5.4).

The malfunction monitoring module (5) preferably comprises a communication unit (5.3) which can perform wired or wireless communication. Remote access is ensured to the malfunction monitoring module (5) by means of the communication unit (5.3). Data transmission between the malfunction monitoring module (5) and the malfunction display module (6) is ensured via the communication unit (5.3). The communication unit (5.3) can perform 3G connection, Ethernet connection, CAN BUS (A Controller Area Network) connection, or Bluetooth connection, and can transmit data through said connections.

The malfunction monitoring module (5) is positioned on or close to or relatively far from the engine to be monitored. The speed sensor (2), temperature sensor (3), and vibration sensor (4) placed on the engine are connected to the malfunction monitoring module (5). In this way, the operating conditions and malfunction situation, the speed, temperature, and vibration measurements of the monitored engine are transferred to the malfunction monitoring module (5). The malfunction monitoring module (5) processor (5.1) processes the speed, temperature, and vibration measurement values for the engine to monitor the operating situation of the engine. The processor (5.1) ensures recording of the analogue measurement values obtained from the vibration sensor (4) and the temperature sensor (3) into the memory (5.2), directly or after coming out of the signal converter (5.4). The speed data for the engine is preferably taken digitally from the speed sensor (2) and recorded directly in the memory (5.2). The speed, temperature, and vibration measurement values are recorded in the memory (5.2) together with the hour, minute, and second information.

In an embodiment of the invention, the measurement values (e.g. the speed, the operating temperature, and the level of vibration) received from the speed sensor (2), the temperature sensor (3), and the vibration sensor (4) are filtered by the filter (5.5), before being recorded in the memory (5.2) or after being recorded in the memory (5.2). With the filter (5.5), frequency components of digital signals such as speed and vibration are found. At the same time, noise filter is applied on said digital signals via the filter (5.5) so that the noise on the signal is reduced, and the vibration value is determined from the signal value.

The malfunction monitoring module (5) processor (5.1) determines, according to the measurement values recorded in the memory (5.2), whether there is vibration or not during operation of the engine. The processor (5.1) is adapted to determine whether there is vibration or not in operation of the engine, whether the vibration causes resonance or not, and to perform vibration classification according to the filtered measurement value received from the vibration sensor (4). The processor (5) preferably compares the measured vibration value with the vibration values found in the experience database (5.6). In the experience database (5.6), the vibration values, and whether the vibration is circular or linear according to the vibration values are recorded. The processor (5.1) compares the measured vibration value and the vibration value found in the experience database (5.6) so as to determine whether there is resonance or not during operation of the engine, and whether the vibration is circular or linear, and then records said information and/or transmits thereof to the malfunction display module (6) through the communication unit (5.3).

In a preferred embodiment of the invention, characteristics of different types of engines are recorded in the experience database (5.6) and/or new recordings can be made by a user or operator according to the engine to be monitored. For example, in a system where the malfunction and maintenance situation of a train is to be checked, first of all the manufacturer company of the train, the type of ball bearing used and the type of mechanical parts used by the manufacturer company, the operating conditions of the ball bearing or materials, and usage threshold values are recorded in the experience database (5.6). Parts maintenance information is also entered in the experience database (5.6) together with the said data. In this way, the replacement periods of different parts of the engine and their maintenance periods can be determined by the processor (5.1). Since usage and malfunction maintenance instructions of engines are not followed closely enough by operators, there may be situations where malfunctions occur or maintenance is needed earlier than the required period due to the expected lives of engines, and such situations can be monitored by the malfunction monitoring module (5). After the maintenance, malfunction, and parts information about the engine are entered, early warning determination is made according to the temperature, speed, and vibration values of the engine, so that the user can be informed about malfunction and maintenance due to usage.

The malfunction monitoring module (5) processor (5.1) determines, according to the measurement values recorded in the memory (5.2), the operating temperature of the engine. According to the filtered measurement values received from the speed sensor (2) and the temperature sensor (3), the processor (5.1) compares the operating speed and temperature of the engine with the values found at the experience database (5.6) of the engine so as to monitor the operating conditions of the engine. The processor (5.1) records the operating conditions and periods of the engine with regard to the temperature, speed, and vibration of the engine, starting from the moment when the engine is started. The processor (5.1) records the measured temperature and speed values and/or transmits thereof to the malfunction display module (6) through the communication unit (5.3).

The processor (5.1) monitors and records the vibration, temperature, speed, and usage period data of the engine during engine operation. The processor (5.1) performs malfunction and maintenance prediction for the engine according to said usage conditions. The processor (5.1) compares the engine usage values with the values found in the experience database (5.6), and calculates, according to the operating condition values, when the engine will need maintenance. The processor (5.1) calculates the probability and expected time of a possible malfunction according to the usage conditions of the engine. The processor (5.1) is adapted to transmit said calculated values to the malfunction display module (6) through the communication unit (5.3).

When there is a malfunction in the engine, the malfunction monitoring module (5) determines the type of the malfunctioning engine, at which temperature, speed, and vibration values the engine had been used before the malfunction, and the reason of occurrence of the malfunction, and then records the same to the experience database (5.6). In this way, encountered malfunctions and malfunction conditions are recorded in the experience database (5.6) so that the malfunction monitoring module (5) can continuously learn about the malfunctions.

In an embodiment of the invention, malfunction monitoring and early warning systems (1) used for different engines in different places can be integrated to each other. Each malfunction monitoring and early warning system (1) malfunction monitoring module (5) shares, via the communication unit (5.3), the newly obtained malfunction and malfunction reason information with the malfunction monitoring modules (5) and experience databases (5.6) found at different places. The processor (5.1) records the new malfunction recordings received from external systems to the experience database (5.6). In this way, the malfunction monitoring and early warning systems (1) learn by themselves and are converted into a structure that can improve their own experience databases (5.6).

Since the malfunction monitoring module (5) monitors the mechanical behaviour of the engine according to the measurement values received from the sensors (2, 3, 4), it can provide information about mechanical fatigue and warning about malfunction in early stages.

In an embodiment of the invention, operation of more than one engine can be monitored via the malfunction monitoring module (5). Individual sensors (2, 3, 4) are used for each engine and the malfunction monitoring module (5) monitors the operating, maintenance, and malfunction conditions of all engines. When there are malfunctions or maintenance is required for more than one engine, the malfunction monitoring module (5) forms the optimum maintenance intervention map so that the user can follow, from the malfunction monitoring module (5) or the malfunction display module (6), by which order the engines should be dealt.

The malfunction display module (6) is the part that visually informs the user about the operating conditions, operating temperature, and malfunction situation of the engine. The malfunction display module (6) can be a smart device, a phone, an indicator panel, a display screen, or a web based application.

In an embodiment of the invention, graphs containing the drawings and schematic images of the engine(s) are found on the malfunction display module (6). Areas are found on said engine drawings where temperature, speed, and vibration values can be shown, and the measurement values received from the malfunction monitoring module (5) are shown on said areas. The malfunction display module (6) allows the user to monitor the operating conditions, malfunction and maintenance predictions, and malfunction situations of the engine. The user can monitor the situation(s) of the engine(s) used, on a display screen via the malfunction display module (6).

In an embodiment of the invention, when the malfunction and maintenance periods of the engines come, warning can be given via the malfunction display module (6). By means of the malfunction display module (6), the user can see the engine which already has a malfunction or will have a malfunction soon, the reason of the malfunction, and the way to deal with the malfunction.

Malfunction monitoring of more than one of the engines found at the same place or at different places can be made via the malfunction display module (6). Moreover, when it is required to access to more than one of the engines, an access and intervention map can be found at the malfunction display module (6) for the engines that are malfunctioning or need maintenance.

In the malfunction monitoring and early warning system (1), the measurement values received from the speed sensor (2), temperature sensor (3), and vibration sensor (4) are interpreted by the malfunction monitoring module (5). Sudden changes in temperature, speed, or vibration during operation of the engine are interpreted by the malfunction monitoring module (5) processor (5.1) by means of comparing the same with the values found in the experience database (5.6). For example, when a malfunction occurs at the measured temperature of 70° C., vibration of 4.6 G value, and speed of 1450 revolution/minute value, the processor (5.1) determines said malfunction as an engine balance defect (imbalance). If the malfunction detected by the processor (5.1) is not recorded in the experience database (5.6), it records said malfunction in the experience database (5.6). Moreover, said malfunction is communicated via the malfunction communication unit (5.3) to the malfunction display module (6) together with the malfunction and the solution proposal. In the malfunction display module (6), said data are simulated and allow providing visual reporting.

The user can also receive a retrospective report according to the date range to be entered from the malfunction display module (6).

The operation of an embodiment of the malfunction monitoring and early warning system (1) according to the invention is as follows. The speed sensor (2), temperature sensor (3), and vibration sensor (4) are mounted on the engine(s). Said sensors (2, 3, 4) are connected to the signal input lines of the malfunction monitoring module (5). If technical data is not found in the experience database (5.6) about the engine to be monitored for malfunction and maintenance, the type, mechanical parts, ball bearings, maintenance times of the parts, and usage conditions of the parts are entered into the experience database (5.6). In this way, the malfunction and maintenance monitoring operations are started. Whenever the engine is used, the malfunction monitoring module (5) receives the engine speed, temperature, and vibration usage information. Analogy signals taken from the engine speed, temperature, and vibration measurements are converted to digital signals by the signal converter (5.4). Afterwards, the speed, temperature, and vibration measurements of the engine are digitally recorded in the memory (5.2). The engine speed, temperature, and vibration measurements are filtered by the filter (5.5) before or after being recorded in the memory (5.2). The vibration value at which the engine operates is quite important especially for engine malfunction and maintenance. The pressure force applied on the parts due to engine vibration and the circular or linear type of said force is faultlessly monitored during malfunction and maintenance operations. The processor (5.1) preferably calculates the measured engine vibration value as vibration G force, makes a classification for vibration as linear or circular vibration, and determines if the result would cause resonance or not, and records this determination in the experience database (5.6). The speed, temperature, and vibration measurements made at the engine are compared by the processor (5.1) with the engine-specific mechanical part usage values found in the experience database (5.6) so as to determine whether a malfunction is found or not found at that moment, and the measured values are recorded in the experience database (5.6). The processor (5.1) is adapted to control the use of the engine over time. Whenever the engine is used, the processor (5.1) monitors the total duration of use and the conditions under which the engine is used, and estimates which parts need maintenance and when they need maintenance by calculating the forces and temperatures applied on the mechanical parts according to the usage conditions. The processor (5.1) communicates all these estimates, malfunction, maintenance, and usage information to the malfunction display module (6) via the communication unit (5.3). The malfunction display module (6) displays the information taken from the malfunction monitoring module (5) to the user in a web-based or a smart device-based manner. The user can preferably monitor the usage status of the engine via the malfunction display module (6), and notifies the user about malfunction notifications and maintenance notifications coming from the malfunction monitoring module (5), and about operations to be performed. Each malfunction that occurs is recorded into the experience database (5.6) by the processor (5.1). The processor (5.1) can use the new malfunction and advice information recorded in the experience database (5.6) for the next troubleshooting comparison. In this way, information about new malfunctions, sources of malfunctions, and ways of solving malfunctions are kept in a continuously learning experience database (5.6), and new data are added into the system as the number of malfunctions increases.

Figure 2:
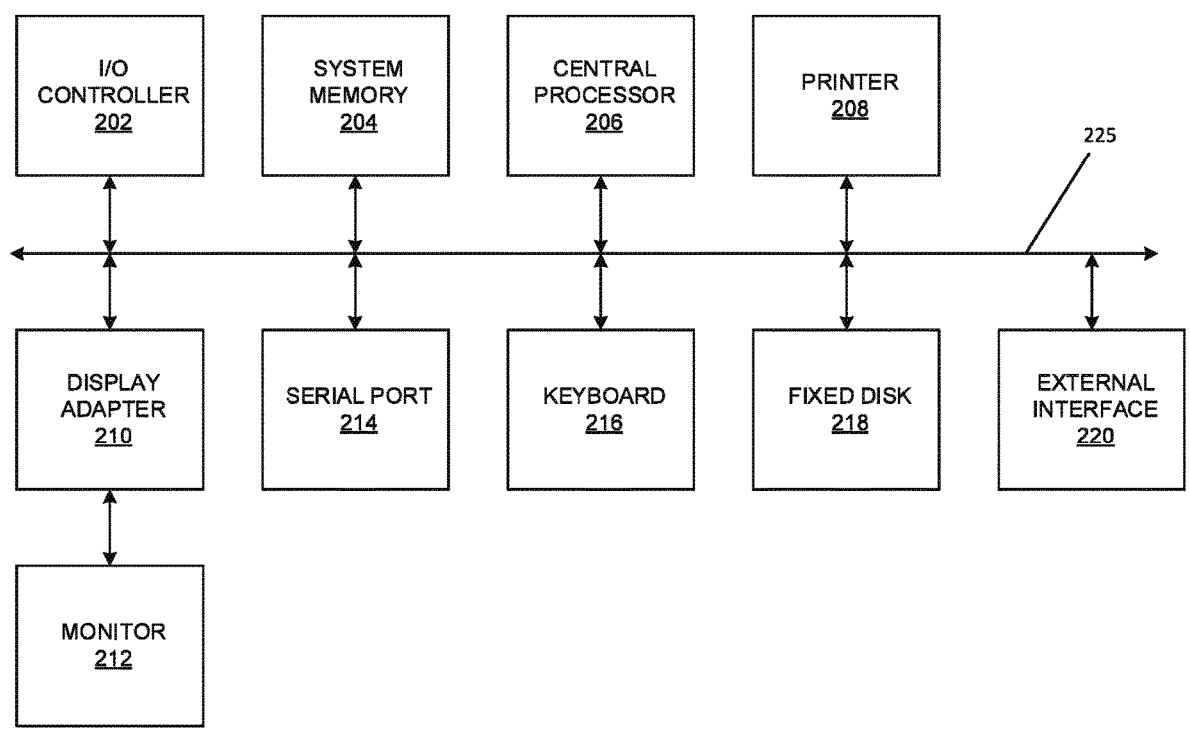
FIG. 2 is a schematic view of an exemplary system for implementing various embodiments described herein.

Any of the elements in FIG. 1 may use any suitable number of subsystems coupled to the malfunction monitoring and early warning system 1 to facilitate the functions described herein. Examples of such subsystems or components are shown in FIG. 2. The subsystems such as a printer 208, keyboard 216, fixed disk 218 (or other memory, such as memory 5.2, comprising computer readable media), monitor 212 (e.g. the malfunction display module 6), which is coupled to a display adapter 210, and others are shown. Peripherals and input/output (I/O) devices, which couple to I/O controller 202, can be connected to the malfunction monitoring and early warning system 1 by any number of means known in the art, such as serial port 214. For example, serial port 214 or external interface 220 can be used to connect the malfunction monitoring and early warning system 1 to a wide area network such as the Internet, a mouse input device, or a scanner. The interconnection via system bus 225 allows a central processor 206 (e.g. the processor 5.1) to communicate with each subsystem and to control the execution of instructions from system memory 204 or the fixed disk 218, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable storage medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A malfunction monitoring and early warning system coupled to an engine comprising:
   a speed sensor coupled to the engine to detect a speed of the engine via an engine rotor,
   a temperature sensor coupled to the engine to measure an operating temperature of the engine,
   a vibration sensor coupled to the engine or a place where the engine is fixed, to measure a level of vibration generated during operation of the engine or the engine is subjected to,
   a malfunction monitoring module comprising a processor, a memory, a communication unit, and an experience database, wherein the malfunction monitoring module is configured to:
      receive measurement values by communicating with the speed sensor, the temperature sensor, and the vibration sensor, wherein the measurement values include the detected speed of the engine, the measured operating temperature, the measured level of vibration,
      perform engine malfunction estimation by interpreting the measurement values according to predetermined engine usage conditions stored in the experience database using the processor,
      predict malfunction and engine maintenance times, and
      predict each malfunction together with a reason of the malfunction by means of recording encountered malfunctions and the speed, the operating temperature, and the level of vibration at which the encountered malfunctions occur,
   wherein the processor is configured to:
      determine parts of the engine that are required to be replaced and corresponding time period for replacing the parts by comparing the measurement values with the predetermined engine usage conditions stored in the experience database, and
      when a type of malfunction that is not recorded in the experience database is encountered, the malfunction monitoring module is configured to:
         determine at which total temperature, speed, and vibration values the engine had been used before the type of malfunction, and the reason of the type of malfunction, and
         record determined values in the experience database together with engine type information thereby continuously updating the experience database with new malfunctions so as to learn about the new malfunctions,
   wherein the experience database is configured to record, via the processor, the malfunction and the reason associated with the malfunction, when an engine malfunction that is not previously recorded is encountered, and to ensure that malfunction control and estimation is performed while a new malfunction analysis is being made, and
   a malfunction display module configured to:
      communicate with the malfunction monitoring module via a wired, wireless, Ethernet, or can bus connection, and
      display visual graphics of the engine to output the engine malfunction, the reason of the engine malfunction, one or more suggestions, and the engine maintenance times based on data received from the malfunction monitoring module.

2. The malfunction monitoring and early warning system according to claim 1, wherein the speed sensor, the temperature sensor, and the vibration sensor have an integrated structure to each other to detect the speed, the operating temperature, and the level of vibration of the engine by means of a single integrated sensor placed on the engine.

3. The malfunction monitoring and early warning system according to claim 1, wherein the malfunction monitoring module comprises:
   signal ports where the speed sensor, the temperature sensor, and the vibration sensor are connected,
   a signal converter which converts analogue signals into digital signals,
   a filter, and
   an amplifier which amplifies the analogue signals.

4. The malfunction monitoring and early warning system according to claim 1, further comprising an amplifier connected to the speed sensor and the temperature sensor, wherein the amplifier is configured to amplify signals received from the speed sensor and the temperature sensor.

5. The malfunction monitoring and early warning system according to claim 1, wherein the communication unit is configured to provide remote access to the malfunction monitoring module, and support data transmission between the malfunction monitoring module and the malfunction display module.

6. The malfunction monitoring and early warning system according to claim 1, wherein the experience database stores information including characteristics of different types of engines, manufacturer company of the engines, type of ball bearings used by the manufacturer company, type of mechanical parts used, operating conditions of the ball bearing or materials used, usage threshold value data, and parts maintenance information.

7. The malfunction monitoring and early warning system according to claim 1, wherein the processor is configured to:
   record, in the memory, the measurement values obtained from the vibration sensor and the temperature sensor, directly or after the measurement values are passed through a signal converter,
   directly record, in the memory, the measurement values received from the speed sensor,
   monitor an operating condition of the engine by processing the measurement values, and
   record the measurement values including the speed, the operating temperature, and the level of vibration in the memory together with associated time information in hours, minutes, and seconds.

8. The malfunction monitoring and early warning system according to claim 1, wherein the processor is configured to determine whether there is a vibration during operation of the engine, whether the vibration causes resonance, and to perform vibration classification according to the measurement values recorded in the memory and the level of vibration received from the vibration sensor.

9. The malfunction monitoring and early warning system according to claim 1, wherein the processor is configured to compare the level of vibration received from the vibration sensor with vibration values found in the experience database, determine, based on the comparing, whether vibration is circular or linear, whether there is resonance during operation of the engine, record determined information, and transmit the determined information to the malfunction display module via the communication unit.

10. The malfunction monitoring and early warning system according to claim 1, wherein the processor is configured to:
monitor and record the level of vibration, the operating temperature, and the speed during operation of the engine as usage values,
compare the usage values of the engine with values found in the experience database,
calculate and estimate the maintenance times of the engine according to the usage values, a possibility of malfunction occurrence according to the usage values, mechanical fatigue, and provide possible early malfunction notification and times, and
transmit values to the malfunction display module through the communication unit.

11. The malfunction monitoring and early warning system according to claim 1, wherein the processor is configured to:
determine, when there is a malfunction in the engine, a type of the engine, at which temperature, speed, and vibration values the engine had been used before the malfunction, and a reason of occurrence of the malfunction,
record determined information to the experience database, and
allow the malfunction monitoring module to continuously learn about malfunctions by automatically recording each engine malfunction and malfunction conditions in the experience database.

12. The malfunction monitoring and early warning system according to claim 1, wherein the malfunction monitoring module is configured to communicate, through the communication unit, with other malfunction monitoring modules and experience databases located at different places, share newly encountered engine malfunctions and associated reasons with the experience databases located at different places, and record, in the experience database, new malfunction records received from other external systems.

13. The malfunction monitoring and early warning system according to claim 1,
wherein the malfunction monitoring module comprises more than one speed sensor inlets, more than one temperature sensor inlets, and more than one vibration sensor inlets, and
wherein the malfunction monitoring module is configured to:
monitor operation of more than one engine,
individually monitor operation, maintenance, and malfunction conditions of all of the engines,
provide an optimal maintenance intervention map when malfunction occurs in or maintenance time comes for more than one engine, and
output, via the malfunction display module, an order in which the engines are to be processed.

14. The malfunction monitoring and early warning system according to claim 1, wherein the malfunction display module is configured to:
display drawings and schematic views of the engine comprising areas where the operating temperature, the speed, and the level of vibration are shown,
display the measurement values received from the malfunction monitoring module in the areas, and
display the engine that has the malfunction or will have the malfunction, the reason for the malfunction, and a way to intervene in the malfunction.

15. The malfunction monitoring and early warning system according to claim 1, wherein the malfunction display module allows malfunction monitoring of more than one engine, and which is adapted to provide an access and intervention map to the engines when it is required to access more than one engine for repairing malfunctions or performing maintenance.

* * * * *